Oct. 6, 1953 S. A. RASMUSSEN 2,654,281
RATCHET WRENCH FOR USE WITH TURNBUCKLES
Filed July 7, 1950
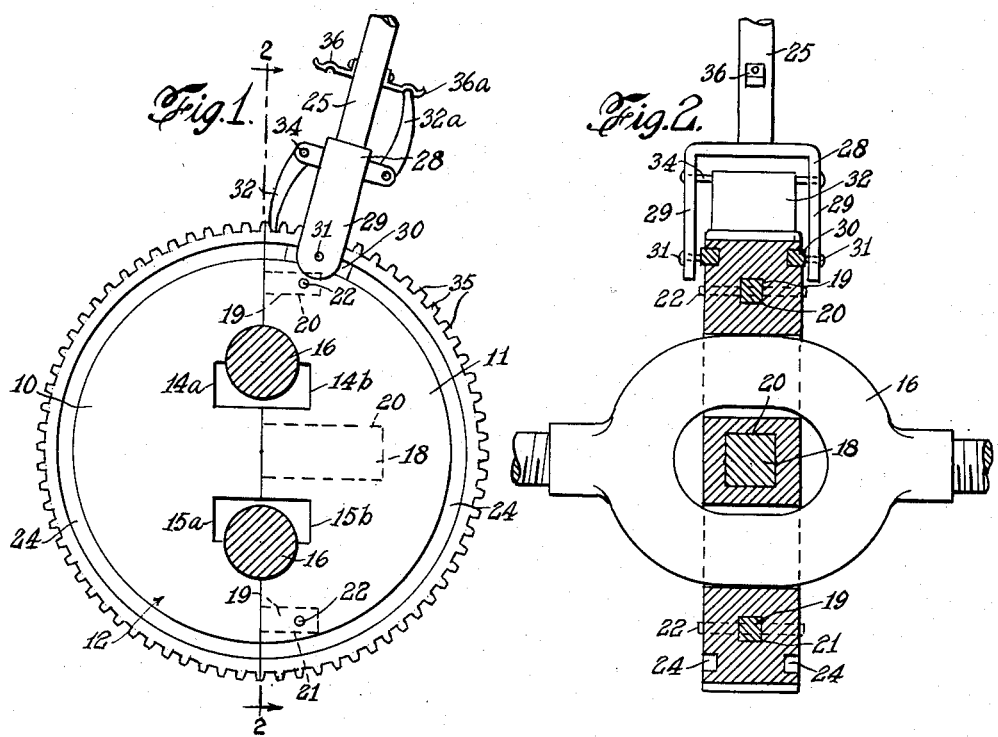
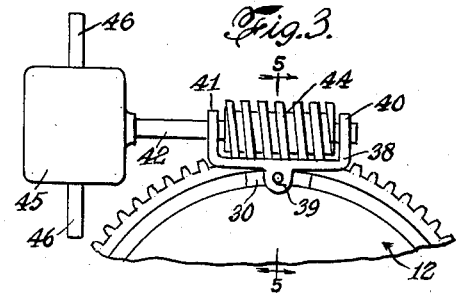
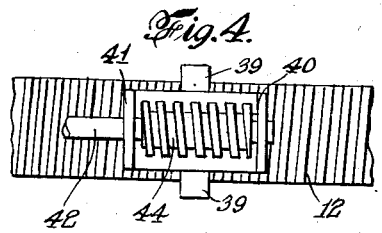
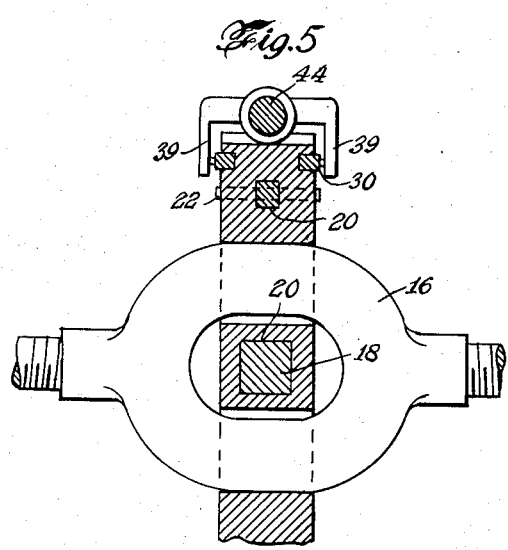
INVENTOR.
SVEND A. RASMUSSEN
BY *Peter U. Boesen*
ATTORNEY.

Patented Oct. 6, 1953

2,654,281

UNITED STATES PATENT OFFICE 2,654,281

RATCHET WRENCH FOR USE WITH TURNBUCKLES

Svend A. Rasmussen, New York, N. Y.

Application July 7, 1950, Serial No. 172,508

1 Claim. (Cl. 81—60)

This invention relates to turnbuckles and to means for tightening and loosening same and more particularly to apparatus and devices for rotating the eye portions of the turnbuckles by ratchet and motor means, though it is noted that in the claim the invention is not limited to ratchets or motors.

Objects of the invention are to provide an improved device or apparatus of this kind which may be used on conventional types of eyed turnbuckles of various sizes.

Other objects of the invention are to provide an improved device of this kind which may be operated by motors to take up or let out slack and manually operated when the buckle is tight.

Additional objects of the invention are to effect simplicity and efficiency in such apparatus and to provide an extremely simple device or apparatus of this kind which is economical, durable, and reliable in operation, and economical to manufacture.

Still other objects of the invention will appear as the description proceeds; and while herein details of the invention are described in the specification and the claim, the invention as described in the claim is not limited to these, and many and various changes may be made without departing from the scope of the invention as claimed in the claim.

The inventive features for the accomplishment of these and other objects are shown herein in connection with a turnbuckle device which briefly stated, includes mating half sections of a gear wheel and means for rotating same when they embrace the eye of the turnbuckle. The means for rotating the composite wheel comprise, for example, manually operated levers and motors.

In the accompanying drawing showing, by way of example, two of many possible embodiments of the invention, Figure 1 is a side elevation showing the wheel and a lever thereon, Figure 2 is a sectional view, mostly in elevation, showing the buckle in the device of Figure 1, the section being taken along the line 2—2 of Figure 1 looking in the direction of the arrows of said line, Figure 3 is a fragmental side elevation showing another form of the invention, Figure 4 is a fragmental plan showing the device of Figure 3, Figure 5 is a fragmental sectional view showing the device of Figures 3 and 4, the section being taken along the line 5—5 of Figure 3 looking in the direction of the arrows of said line.

The turnbuckle of Figures 1 and 2 comprises two mating semi-circular gear sections 10 and 11 forming a gear wheel 12 and having spaced slots 14a, 14b and 15a, 15b in the diametric edge portions thereof and equidistant from the center, said slots being adapted to receive the eye 16 of a turnbuckle. One of said sections 10 has dowel projections 18 and 19, one large projection 18 being substantially at the center of the section and two projections 19 being intermediate of a respective slot and the peripheral portion of the section. The other section 11 is provided with recesses 20 and 21 (Figure 2) to receive said dowel projections. Pins 22 pass through the section having the recesses and through the projections for locking the dowels in the recesses, the wheel as a whole is provided with peripheral grooves 24 in the side faces of the wheel.

A ratchet lever 25 serves as one means for rotating the wheel and comprises a long handle having a yoke 28, the arms 29 which embrace the peripheral portion of the wheel, and are held to the wheel by arcuate members 30 slidable in said grooves 24 and pivotally secured as at 31 to said arms. A pawl 32 is pivoted to the yoke as at 34 and made to engage the teeth 35 of the wheel and adapted to be swung back near to the handle where a clip hook 36 on the handle holds the pawl in inoperative position. A second pawl 32a and hook 36a on the yoke and handle, respectively, are provided for rotating the wheel in the opposite direction.

In another form of the invention as shown in Figures 3, 4 and 5 the wheel 12 is actuated by a worm engaging the wheel and the embodiment comprises a carrier 38 having side strips 39 substantially engaging the peripheral side faces of the wheel and pivotally secured to arcuate members similar to those shown at 30 in the grooves of the wheel. Forward and rear bearings 40, 41 on the strips carry a drive shaft 42 rotatable in said bearings which is provided with a worm 44 on the shaft between the bearings and engages the wheel. The shaft is rotated by means of a motor 45 having long radial handles 46.

It is preferable, though not necessary, to leave the ratchet lever or carrier and worm on one section when not in use. Then when the wrench or tightener is to be used, that section is disposed against the eye portion of the buckle and the mating section joined to that section. It is not necessary to employ the pins 22 for holding the sections together if the dowels make a tight fit. By use of the ratchet lever the wheel may be rotated to tighten, or loosen, the turnbuckle.

The ratchet lever is especially advantageous when the buckle is tight or nearly so.

When there is considerable slack to be taken up, the motor driven worm is more convenient. The carrier 38 may be mounted on a half section already on the buckle by giving the worm a few turns by hand to thread the worm onto the section. In general, it is advisable to use the motor and worm only for taking up or letting out, slack, since the motor must be held against the substantial movement only by hand.

It will be realized that there is no need for a reversible motor to operate the device since the forward position of the worm shaft may be reversed with respect to the wheel.

The speed ratio of the worm to the wheel should be large so that a small motor may be used and also to prevent rapid motion of the carrier and motor should it be difficult to hold the latter. However, it is preferable that the gear teeth 35 be large enough to permit satisfactory operation with the ratchet lever 25 when desired.

What I claim as new and desire to secure by Letters Patent of the United States, is:

The combination of a turnbuckle, forming a gear wheel, with a ratchet lever, whereby to turn the former, said ratchet lever comprising a long handle having a yoke, the arms of the latter embracing the peripheral portion of said wheel, arcuate members pivotally secured to said arms and slidable in grooves of said peripheral portion, a pawl pivoted to said yoke and made to engage the teeth of said wheel, said pawl being adapted to be swung back close to said handle, and a clip hook on the latter for securing the pawl in inoperative position, a second pawl on the yoke, and hook on said handle being adapted for rotating the wheel in the opposite direction.

SVEND A. RASMUSSEN.

References Cited in the file of this patent

UNITED STATES PATENTS

| Number | Name | Date |
|---|---|---|
| 134,007 | Sanborn | Dec. 17, 1872 |
| 645,265 | Kingsley | Mar. 13, 1900 |
| 1,011,092 | Sweney | Dec. 5, 1911 |
| 1,357,707 | Helm | Nov. 2, 1920 |
| 1,542,291 | Economides | June 16, 1925 |
| 1,617,509 | Thrift | Feb. 15, 1927 |
| 1,878,055 | Wittliff | Sept. 20, 1932 |
| 1,927,388 | Bardwell | Sept. 19, 1933 |
| 2,097,358 | Whittaker | Oct. 26, 1937 |
| 2,259,922 | Bohlander | Oct. 21, 1941 |
| 2,386,342 | Price | Oct. 9, 1945 |
| 2,536,172 | Halperin | Jan. 2, 1951 |